US010460678B2

(12) United States Patent
Choi et al.

(10) Patent No.: US 10,460,678 B2
(45) Date of Patent: Oct. 29, 2019

(54) DISPLAY DEVICE AND METHOD OF DRIVING THE SAME

(71) Applicant: SAMSUNG DISPLAY CO., LTD., Yongin-si, Gyeonggi-Do (KR)

(72) Inventors: Hyong Do Choi, Yongin-si (KR); Seung Gil Baek, Changwon-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/814,539

(22) Filed: Nov. 16, 2017

(65) Prior Publication Data

US 2018/0144691 A1  May 24, 2018

(30) Foreign Application Priority Data

Nov. 23, 2016  (KR) .................. 10-2016-0156329

(51) Int. Cl.
G09G 3/34 (2006.01)
G02F 1/1335 (2006.01)
H05B 33/08 (2006.01)

(52) U.S. Cl.
CPC ....... G09G 3/342 (2013.01); G02F 1/133603 (2013.01); G09G 3/3413 (2013.01); H05B 33/0857 (2013.01); G09G 2320/0242 (2013.01); G09G 2320/041 (2013.01); G09G 2320/0626 (2013.01); G09G 2320/0666 (2013.01); H05B 33/0845 (2013.01)

(58) Field of Classification Search
CPC ................. G09G 3/342; G09G 3/3413; G09G 2320/0626; G02F 1/133603; H05B 33/0845
See application file for complete search history.

(56) References Cited

U.S. PATENT DOCUMENTS

2009/0231354 A1* 9/2009 Blaut ................... G09G 3/3413
345/589
2013/0016310 A1* 1/2013 Kanemitsu ......... H05B 33/0818
349/69
2014/0015824 A1* 1/2014 Chaji ....................... G09G 3/32
345/212
2014/0145234 A1* 5/2014 Takahashi ............ G09G 3/3233
257/98

FOREIGN PATENT DOCUMENTS

| KR | 10-0714621 | 4/2007 |
| KR | 1020110035992 | 4/2011 |
| KR | 1020110071938 | 6/2011 |
| KR | 10-1228922 | 1/2013 |
| KR | 10-1306138 | 9/2013 |
| KR | 1020140116716 | 10/2014 |

* cited by examiner

Primary Examiner — Charles V Hicks
(74) Attorney, Agent, or Firm — F. Chau & Associates, LLC

(57) ABSTRACT

A display device includes a light emitting diode array including a plurality of light emitting diodes, a monitoring circuit configured to generate a monitoring signal corresponding to a forward voltage of a first light emitting diode of the plurality of light emitting diodes, a backlight controller configured to control the amount of current flowing to the light emitting diode array, and a first luminance compensation circuit configured to increase the amount of current flowing to the light emitting diode array in response to the monitoring signal.

15 Claims, 9 Drawing Sheets

| | Vmo | LUT value (CCS) | Luminance weight value | Color coordinate weight value | | |
|---|---|---|---|---|---|---|
| | | | | Red | Green | Blue |
| High temperature ↑ | 1.00 | 0001100100 | 1.20 | 1.00 | 1.00 | 0.80 |
| | 0.95 | 0001011111 | 1.19 | 1.00 | 1.00 | 0.81 |
| | 0.90 | 0001011010 | 1.18 | 1.00 | 1.00 | 0.82 |
| | 0.85 | 0001010101 | 1.17 | 1.00 | 1.00 | 0.83 |
| | 0.80 | 0001010000 | 1.16 | 1.00 | 1.00 | 0.84 |
| | 0.75 | 0001001011 | 1.15 | 1.00 | 1.00 | 0.85 |
| | 0.70 | 0001000110 | 1.14 | 1.00 | 1.00 | 0.86 |
| | 0.65 | 0001000001 | 1.13 | 1.00 | 1.00 | 0.87 |
| | 0.60 | 0000111100 | 1.12 | 1.00 | 1.00 | 0.88 |
| | 0.55 | 0000110111 | 1.11 | 1.00 | 1.00 | 0.89 |
| | 0.50 | 0000110010 | 1.10 | 1.00 | 1.00 | 0.90 |
| | 0.45 | 0000101101 | 1.09 | 1.00 | 1.00 | 0.91 |
| | 0.40 | 0000100111 | 1.08 | 1.00 | 1.00 | 0.92 |
| | 0.35 | 0000100010 | 1.07 | 1.00 | 1.00 | 0.93 |
| | 0.30 | 0000011101 | 1.06 | 1.00 | 1.00 | 0.94 |
| | 0.25 | 0000011000 | 1.05 | 1.00 | 1.00 | 0.95 |
| | 0.20 | 0000010011 | 1.04 | 1.00 | 1.00 | 0.96 |
| | 0.15 | 0000001110 | 1.03 | 1.00 | 1.00 | 0.97 |
| | 0.10 | 0000001001 | 1.02 | 1.00 | 1.00 | 0.98 |
| | 0.05 | 0000000100 | 1.01 | 1.00 | 1.00 | 0.99 |
| Room temperature | 0.00 | 0000000000 | 1.00 | 1.00 | 1.00 | 1.00 |

FIG. 6

| Vmo | LUT value (CCS) | Luminance weight value | Color coordinate weight value | | |
|---|---|---|---|---|---|
| | | | Red | Green | Blue |
| 0.00 | 0000000000 | 1.00 | 1.00 | 1.00 | 1.00 |
| -0.05 | 1111111011 | 0.99 | 0.99 | 0.99 | 1.00 |
| -0.10 | 1111110110 | 0.98 | 0.98 | 0.98 | 1.00 |
| -0.15 | 1111110001 | 0.97 | 0.97 | 0.97 | 1.00 |
| -0.20 | 1111101100 | 0.96 | 0.96 | 0.96 | 1.00 |
| -0.25 | 1111100111 | 0.95 | 0.95 | 0.95 | 1.00 |
| -0.30 | 1111100010 | 0.94 | 0.94 | 0.94 | 1.00 |
| -0.35 | 1111011101 | 0.93 | 0.93 | 0.93 | 1.00 |
| -0.40 | 1111011000 | 0.92 | 0.92 | 0.92 | 1.00 |
| -0.45 | 1111010011 | 0.91 | 0.91 | 0.91 | 1.00 |
| -0.50 | 1111001110 | 0.90 | 0.90 | 0.90 | 1.00 |
| -0.55 | 1111001001 | 0.89 | 0.89 | 0.89 | 1.00 |
| -0.60 | 1111000100 | 0.88 | 0.88 | 0.88 | 1.00 |
| -0.65 | 1110111111 | 0.87 | 0.87 | 0.87 | 1.00 |
| -0.70 | 1110111010 | 0.86 | 0.86 | 0.86 | 1.00 |
| -0.75 | 1110110101 | 0.85 | 0.85 | 0.85 | 1.00 |
| -0.80 | 1110110000 | 0.84 | 0.84 | 0.84 | 1.00 |
| -0.85 | 1110101011 | 0.83 | 0.83 | 0.83 | 1.00 |
| -0.90 | 1110100110 | 0.82 | 0.82 | 0.82 | 1.00 |
| -0.95 | 1110100001 | 0.81 | 0.81 | 0.81 | 1.00 |
| -1.00 | 1110011100 | 0.80 | 0.80 | 0.80 | 1.00 |

Room temperature ← → Low temperature

DISPLAY DEVICE AND METHOD OF DRIVING THE SAME

CROSS-REFERENCE TO RELATED APPLICATION

This application claims priority under 35 U.S.C. § 119 to Korean Patent Application No. 10-2016-0156329 filed in the Korean Intellectual Property Office on Nov. 23, 2016, the disclosure of which is incorporated by reference herein in its entirety.

TECHNICAL FIELD

Exemplary embodiments of the inventive concept relate to a display device and a driving method thereof, and more particularly, to a display device that can adjust color coordinates and luminance, and a driving method thereof.

DISCUSSION OF RELATED ART

A display device includes a display panel that includes a plurality of pixels for displaying an image. The plurality of pixels are arranged in a matrix format and connected to a plurality of gate lines extending in a row direction and a plurality of data lines extending in a column direction. Each of the plurality of pixels receives a gate signal applied through one of the plurality of gate lines and a data signal applied through one of the plurality of data lines in synchronization with the respective gate signal.

A liquid crystal display (LCD) is a type of display device including a backlight device that emits light toward the display panel at a rear side of the display panel. Light emitted from the backlight device is converted to a plurality of gray levels while passing through the display panel such that an image is displayed. The light emitted from the backlight device tends to vary in wavelength depending on an ambient temperature, and accordingly, color of the light may be bluish or reddish depending on the ambient temperature. When the color of the light emitted from the backlight device is changed, a color of the image displayed on the display panel is changed, causing image quality failure of the display device.

SUMMARY

According to an exemplary embodiment of the inventive concept, a display device includes a light emitting diode array including a plurality of light emitting diodes, a monitoring circuit configured to generate a monitoring signal corresponding to a forward voltage of a first light emitting diode of the plurality of light emitting diodes, a backlight controller configured to control the amount of current flowing to the light emitting diode array, and a first luminance compensation circuit configured to increase the amount of current flowing to the light emitting diode array in response to the monitoring signal.

The first luminance compensation circuit may increase the amount of current flowing to the light emitting diode array when the forward voltage of the first light emitting diode is decreased.

The monitoring circuit may include a first monitoring amplifier that includes a first input terminal connected to an anode of the first light emitting diode, a second input terminal connected to a cathode of the first light emitting diode, and an output terminal configured to output a first voltage difference between the anode and the cathode.

The monitoring circuit may further include a second monitoring amplifier that includes a first input terminal connected to a reference voltage of the first light emitting diode, a second input terminal connected to the output terminal of the first monitoring amplifier, and an output terminal configured to output a second voltage difference between the first voltage difference and the reference voltage as the monitoring signal.

The reference voltage of the first light emitting diode may be the forward voltage of the first light emitting diode at a predetermined reference temperature.

The backlight controller may include a first transistor connected between the light emitting diode array and a ground, a first amplifier including an output terminal connected to a gate electrode of the first transistor, a second transistor including a gate electrode connected to a first node, and connected between a power voltage and the first amplifier, a second amplifier including a first input terminal to which a backlight control signal is input, and a third transistor including a gate electrode connected to an output terminal of the second amplifier, and connected between the first node and the ground.

The backlight controller may further include a fourth transistor that includes a gate electrode connected to the first node and is connected between the power voltage and the third transistor.

The first luminance compensation circuit may include a fifth transistor that includes a gate electrode configured to receive the monitoring signal and is connected between the first node and the ground.

The display device may further include an analog-to-digital (A/D) converter configured to convert the monitoring signal to a digital color coordinate control signal.

The display device may further include a second luminance compensation circuit configured to decrease the amount of current flowing to the light emitting diode array in response to the digital color coordinate control signal.

The second luminance compensation circuit may include a variable resistor connected between the third transistor and the ground, and a resistance value of the variable resistor may be changed in response to the digital color coordinate control signal.

The second luminance compensation circuit may decrease the amount of current flowing to the light emitting diode array when the forward voltage of the first light emitting diode is increased.

The display device may further include, a first lookup table that includes a plurality of first color coordinate weight values maintaining color coordinate values of red and green with a reference value and decreasing a color coordinate value of blue as a temperature of the light emitting diode array is increased from a predetermined reference temperature; and an image data generator configured to select one of the plurality of first color coordinate weight values that corresponds to the digital color coordinate control signal from the first lookup table and to generate an image data signal using the selected one of the plurality of first color coordinate weight values.

The display device may further include a second lookup table that includes a plurality of second color coordinate weight values maintaining the color coordinate value of blue with the reference value and decreasing the color coordinate values of red and green as the temperature of the light emitting diode array is decreased from the predetermined reference temperature. The image data generator may select one of the plurality of second color coordinate weight values corresponding to the digital color coordinate control signal from the second lookup table and may generate the image data signal using the selected one of the plurality of second color coordinate weight values.

According to an exemplary embodiment of the inventive concept, a driving method of a display device includes measuring a forward voltage of one of a plurality of light emitting diodes included in a backlight circuit, increasing luminance of the backlight circuit when the forward voltage is lower than a reference voltage, and decreasing luminance of the backlight circuit when the forward voltage is higher than the reference voltage.

The driving method of the display device may further include generating an image data signal by maintaining color coordinate values of red and green with a reference value and reducing a color coordinate value of blue when the forward voltage is lower than the reference voltage.

The driving method of the display device may further include generating the image data signal by maintaining the color coordinate value of blue with the reference value and reducing color coordinate values of red and green when the forward voltage is higher than the reference voltage.

The driving method of the display device may further include maintaining luminance of the backlight circuit with a reference value when the forward voltage equals the reference voltage.

According to an exemplary embodiment of the inventive concept, a display device includes a display portion, a backlight circuit including a plurality of light emitting diodes and configured to emit light toward the display portion, an analog-to-digital (A/D) converter configured to provide a color coordinate control signal to the backlight circuit in response to a monitoring signal, and a monitoring circuit configured to generate the monitoring signal corresponding to a forward voltage of one of the plurality of light emitting diodes and to provide the monitoring signal to the backlight circuit and the A/D converter. The backlight circuit is configured to adjust luminance of the emitted light in response to the monitoring signal and the color coordinate signal.

The backlight circuit may increase the luminance by increasing the amount of current flowing to the plurality of light emitting diodes when an ambient temperature of the plurality of light emitting diodes increases from a reference temperature. The backlight circuit may decrease the luminance by reducing the amount of current flowing to the plurality of light emitting diodes when the ambient temperature decreases from the reference temperature.

BRIEF DESCRIPTION OF THE DRAWINGS

FIG. 6 illustrates a low-temperature lookup table of FIG. 4 according to an exemplary embodiment of the inventive concept.

DETAILED DESCRIPTION OF THE EMBODIMENTS

Figure 1:
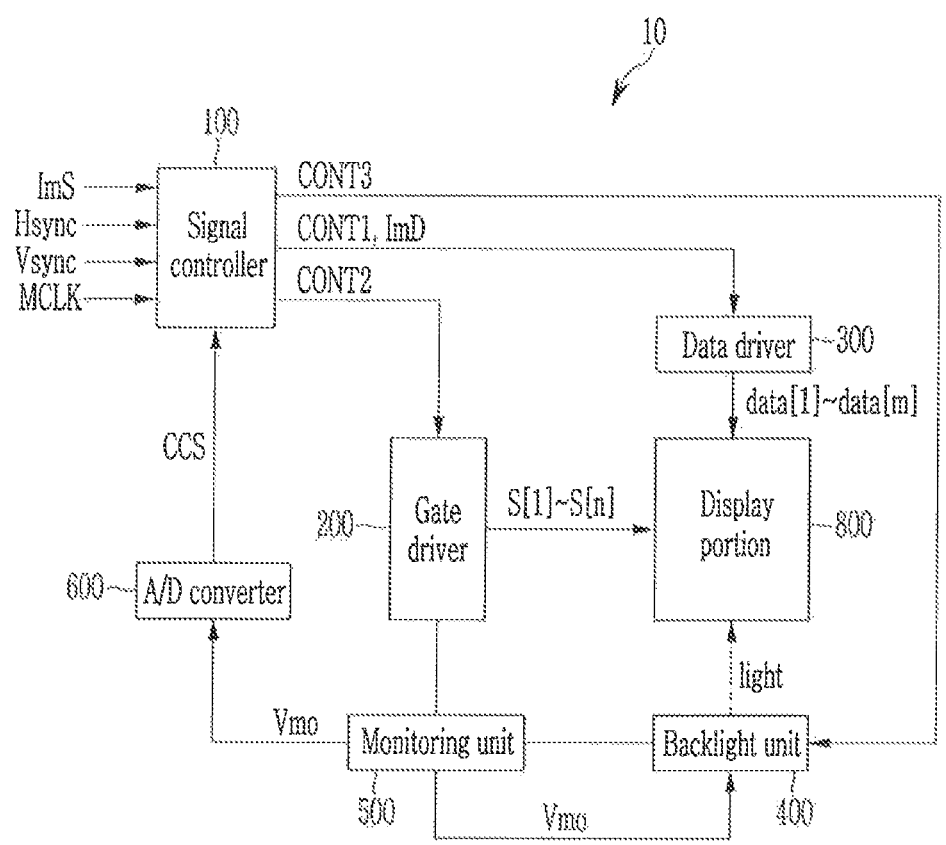
FIG. 1 is a schematic block diagram of a display device according to an exemplary embodiment of the inventive concept.

Exemplary embodiments of the inventive concept provide a display device that can prevent a color sense of an image from being changed due to temperature, by adjusting color coordinates and luminance according to the temperature.

Exemplary embodiments of the inventive concept will be described in more detail hereinafter with reference to the accompanying drawings. Like reference numerals may refer to like elements throughout this application.

Hereinafter, referring to FIG. 1 to FIG. 6, a display device according to an exemplary embodiment of the inventive concept will be described.

FIG. 1 is a schematic block diagram of a display device according to an exemplary embodiment of the inventive concept.

Referring to FIG. 1, a display device 10 includes a signal controller 100, a gate driver 200, a data driver 300, a backlight unit 400, a monitoring unit 500, an analog-to-digital (A/D) converter 600, and a display portion 800. The display device 10 may be a liquid crystal display (LCD).

The signal controller 100 receives an image signal ImS and a synchronization signal input from an external device. The image signal ImS includes luminance information of a plurality of pixels. Luminance may have gray levels of, for example, 1024 ($=2^{10}$), 256 ($=2^{8}$), or 64 ($=2^{6}$). The synchronization signal includes a horizontal synchronization signal Hsync, a vertical synchronization signal Vsync, and a main clock signal MCLK.

The signal controller 100 generates a first driving control signal CONT1, a second driving control signal CONT2, a third driving control signal CONT3, and an image data signal ImD using the image signal ImS, the horizontal synchronization signal Hsync, the vertical synchronization signal Vsync, and the main clock signal MCLK.

The signal controller 100 divides the image signal ImS by frame units according to the vertical synchronization signal Vsync, and generates the image data signal ImD by dividing the image signal ImS by gate line units according to the horizontal synchronization signal Hsync. The signal controller 100 transmits the image data signal ImD to the data driver 300 together with the first driving control signal CONT1. The signal controller 100 transmits the second driving control signal CONT2 to the gate driver 200. The signal controller 100 transmits the third driving control signal CONT3 to the backlight unit 400. The third driving control signal CONT3 may include a backlight control signal PWM, which will be described below with reference to FIG. 2.

The display portion 800 is a display area including the plurality of pixels. In the display portion 800, a plurality of gate lines and a plurality of data lines are formed to be connected with the plurality of pixels. The plurality of gate lines extend substantially in a row direction and are substantially in parallel with one another, and the plurality of data lines extend substantially in a column direction and are substantially in parallel with one another.

Each of the plurality of pixels may emit light of one of primary colors. The primary colors include red, green, and blue, and the three primary colors are spatially or temporally combined to obtain a desired color. A color may be represented by a red pixel, a green pixel, and a blue pixel. A red pixel, a green pixel, and a blue pixel may be collectively referred to as one pixel.

The gate driver 200 is connected to the plurality of gate lines, and generates a plurality of gate signals S[1] to S[n] according to the second driving control signal CONT2. The gate driver 200 may sequentially apply the plurality of gate signals S[1] to S[n] with a gate-on voltage to the plurality of gate lines.

The data driver 300 is connected to the plurality of data lines, performs sampling and holding on the image data signal ImD according to the first driving control signal CONT1, and transmits a plurality of data voltages data[1]-data[m] to the plurality of data lines. The data driver 300 is synchronized with a time when the plurality of gate signals S[1] to S[n] have the gate-on voltage, and thus applies the plurality of data voltages data[1] to data[m], according to the image data signal ImD, to the plurality of data lines.

The backlight unit 400 includes at least one light source, and receives a backlight power voltage from an external device and emits light toward the display portion 800. Light emitted from the backlight unit 400 is converted to a plurality of gray levels that correspond to the plurality of data voltages data[1] to data[m], applied to the plurality of pixels while passing through the display portion 800, such that an image can be displayed. A light source of the backlight unit 400 may include a plurality of light emitting diodes (LED), which will be described below with reference to FIG. 2 and FIG. 3. The backlight unit 400 may adjust luminance of emitted light by controlling the amount of current flowing to the plurality of LEDs according to the third driving control signal CONT3.

The monitoring unit 500 measures a forward voltage (refer to Vf of FIG. 3) of one of the plurality of light emitting diodes LEDs included in the backlight unit 400, and generates a monitoring signal Vmo corresponding to the forward voltage Vf.

The monitoring signal Vmo may correspond to a difference between a reference voltage of the light emitting diode LED and the forward voltage Vf. The reference voltage of the light emitting diode LED may be the forward voltage Vf of the light emitting diode LED at a predetermined reference temperature. For example, the reference temperature may be room temperature of about 25° C. In other words, the monitoring signal Vmo may correspond to a variable value as determined by a comparison between the forward voltage Vf of the light emitting diode LED at a measurement temperature and the forward voltage Vf of the light emitting diode LED at the reference temperature.

The monitoring unit 500 transmits the monitoring signal Vmo to the A/D converter 600 and the backlight unit 400.

The backlight unit 400 may increase the luminance of the emitted light by increasing the amount of current flowing to the light emitting diode LED according to the monitoring signal Vmo.

The A/D converter 600 converts the monitoring signal Vmo, which is analog, to a digital color coordinate control signal CCS. The A/D converter 600 transmits the color coordinate control signal CCS to the signal controller 100.

The signal controller 100 includes a high-temperature lookup table 120 and a low-temperature lookup table 130 which will be described below with reference to FIG. 4, and may adjust coordinates of the image data signal ImD by using the high-temperature lookup table 120 or the low-temperature lookup table 130 according to the color coordinate control signal CCS.

Figure 2:
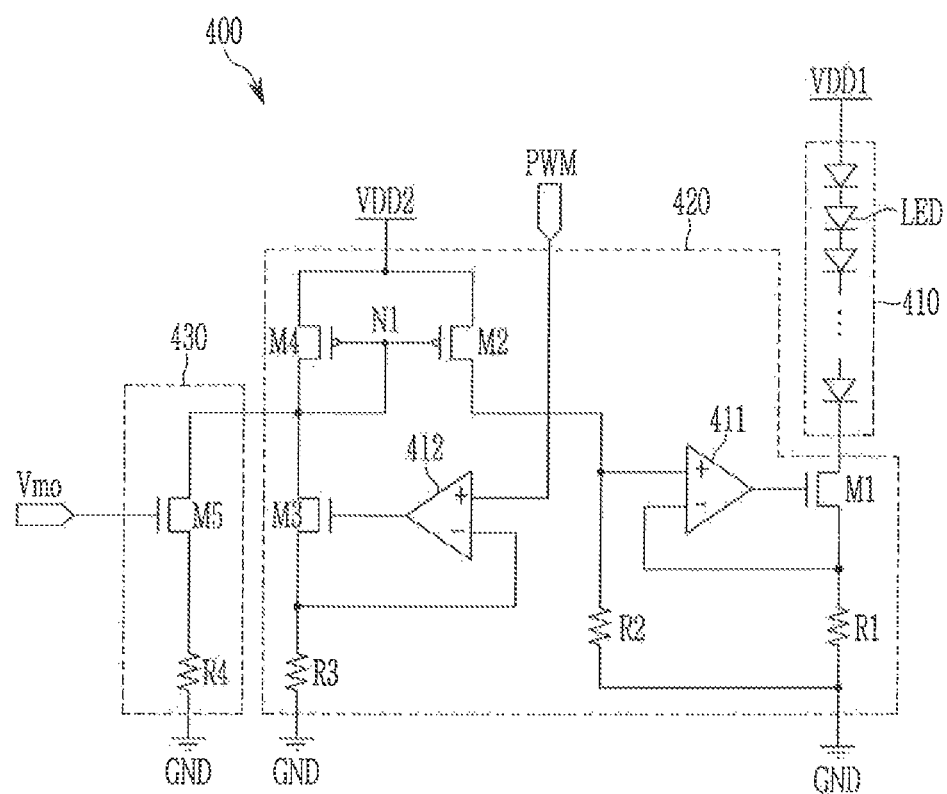
FIG. 2 illustrates a backlight unit included in the display device of FIG. 1 according to an exemplary embodiment of the inventive concept.

FIG. 2 illustrates a backlight unit included in the display device of FIG. 1 according to an exemplary embodiment of the inventive concept.

Referring to FIG. 2, the backlight unit 400 includes at least one light emitting diode array 410, a backlight controller 420, and a first luminance compensation unit 430.

The light emitting diode array 410 may include a plurality of light emitting diodes LEDs coupled in series. One end of the light emitting diode array 410 may be connected to a first power voltage VDD1 and the other end may be connected to a ground GND. The plurality of light emitting diodes LED included in the light emitting diode array 410 may emit light by a current flowing to the ground GND from the first power voltage VDD1. The first power voltage VDD1 may be sufficiently high to make a predetermined maximum current flow to the plurality of light emitting diodes LED coupled in series.

The backlight controller 420 includes a first transistor M1, a second transistor M2, a third transistor M3, a fourth transistor M4, a first amplifier 411, a second amplifier 412, a first resistor R1, a second resistor R2, and a third resistor R3.

The first transistor M1 includes a gate electrode connected to the first amplifier 411, a first electrode connected to the light emitting diode array 410, and a second electrode connected to the ground GND. The first resistor R1 may be connected between the first transistor M1 and the ground GND.

The second transistor M2 includes a gate electrode connected to a first node N1, a first electrode connected to a second power voltage VDD2, and a second electrode connected to the first amplifier 411 and the ground GND. The second resistor R2 may be connected between the second electrode of the second transistor M2 and the ground GND. The second transistor M2 may transmit the second power voltage VDD2 to the first amplifier 411 according to a voltage of the first node N1. The second power voltage VDD2 may be a high-level voltage.

The first amplifier 411 includes a first input terminal (+) connected to the second electrode of the second transistor M2 and the ground GND, a second input terminal (−) connected to the second electrode of the first transistor M1, and an output terminal connected to the gate electrode of the first transistor M1. The second resistor R2 may be connected between the first input terminal (+) of the first amplifier 411 and the ground GND. The first input terminal (+) may be a non-inversion terminal and the second input terminal (−) may be an inversion terminal.

The third transistor M3 includes a gate electrode connected to the second amplifier 412, a first electrode connected to the first node N1, and a second electrode connected to the ground GND. The third resistor R3 may be connected between the third transistor M3 and the ground GND.

The second amplifier 412 includes a first input terminal (+) to which the backlight control signal PWM is input, a second input terminal (−) connected to the second electrode of the third transistor M3, and an output terminal connected to the gate electrode of the third transistor M3. The backlight control signal PWM may be a pulse width modulation signal formed of a combination of a high-level voltage and a low-level voltage. The second amplifier 412 may turn on or turn off the third transistor M3 in response to the backlight control signal PWM.

The fourth transistor M4 includes a gate electrode connected to the first node N1, a first electrode connected to the second power voltage VDD2, and a second electrode connected to the first node N1.

The first luminance compensation unit 430 includes a fifth transistor M5. The fifth transistor M5 includes a gate electrode receiving the monitoring signal Vmo, a first electrode connected to the first node N1, and a second electrode connected to the ground GND. The fourth resistor R4 may be connected between the fifth transistor M5 and the ground GND.

The first transistor M1, the third transistor M3, and the fifth transistor M5 may be n-channel field effect transistors, and the second transistor M2 and the fourth transistor M4 may be p-channel field effect transistors. A gate-on voltage that turns on the n-channel field effect transistor may be a high-level voltage, and a gate-off voltage that turns off the n-channel field effect transistor may be a low-level voltage. A gate-on voltage that turns on the p-channel field effect transistor may be a low-level voltage, and a gate-off voltage that turns off the p-channel field effect transistor may be a high-level voltage.

According to an exemplary embodiment of the inventive concept, the first transistor M1, the third transistor M3, and the fifth transistor M5 may instead be p-channel field effect transistors, and the second transistor M2 and the fourth transistor M4 may be n-channel field effect transistors.

Hereinafter, the first transistor M1, the third transistor M3, and the fifth transistor M5 will be described as n-channel field effect transistors, and the second transistor M2 and the fourth transistor M4 will be described as p-channel field effect transistors.

The second amplifier 412 generates an output according to an input difference between the first input terminal (+) and the second input terminal (−), the third transistor M3 operates according to the output of the second amplifier 412, and an input of the first input terminal (+) and an input of the second input terminal (−) of the second amplifier 412 may be controlled to be the same voltage.

When the backlight control signal PWM is at a high level, a current flowing to the resistor R3 flows to the second transistor M2 through a current mirror circuit formed of the second transistor M2 and the fourth transistor M4. A voltage of the first input terminal (+) of the first amplifier 411 is determined by a value that corresponds to a product of the current flowing to the second transistor M2 and the current flowing to the second resistor R2, and because the first amplifier 411 operates as the second amplifier 412 operates, a voltage supplied to one end of the first resistor R1, e.g., a voltage of the second input terminal (−) of the first amplifier 411, is controlled to be the same as the voltage of the first input terminal (+) of the first amplifier 411 so that a current flowing to the light emitting diode array 410 can be controlled.

In the present exemplary embodiment, the fifth transistor M5 is added to be connected to the fourth transistor M4, and thus the fifth transistor M5 generates a current according to the monitoring signal Vmo so that the amount of current flowing to the second transistor M2 can be increased through the current mirror circuit. In other words, the amount of current flowing to the second transistor M2 can be increased as much as the amount of current flowing to the fourth resistor R4, and accordingly, the amount of current flowing to the light emitting diode array 410 can be increased.

As described above, the first luminance compensation unit 430 can increase the amount of current flowing to the light emitting diode array 410 by the monitoring signal Vmo, thus increasing the luminance of light emitted from the backlight unit 400.

Figure 3:
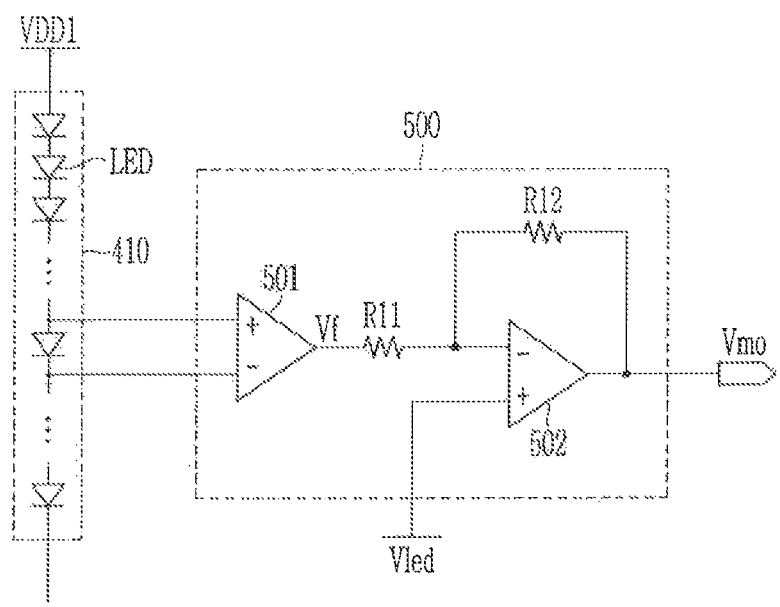
FIG. 3 illustrates a monitoring unit included in the display device of FIG. 1 according to an exemplary embodiment of the inventive concept.

FIG. 3 illustrates a monitoring unit included in the display device of FIG. 1 according to an exemplary embodiment of the inventive concept.

Referring to FIG. 3, the monitoring unit 500 includes a first monitoring amplifier 501, a second monitoring amplifier 502, a first resistor R11, and a second resistor R12.

The first monitoring amplifier 501 includes a first input terminal (+) connected to an anode of a light emitting diode LED among the plurality of light emitting diodes LEDs included in the light emitting diode array 410, a second input terminal (−) connected to a cathode of the light emitting diode LED, and an output terminal outputting the forward voltage Vf of the light emitting diode LED. The forward voltage Vf of the light emitting diode LED may be a voltage difference between the anode and the cathode of the light emitting diode LED.

The second monitoring amplifier 502 includes a first input terminal (−) connected to a reference voltage Vled of the light emitting diode LED, a second input terminal (−) connected to the output terminal of the first monitoring amplifier 501, and an output terminal outputting the monitoring signal Vmo. The reference voltage Vled may correspond to a predetermined reference temperature, and for example, may be a forward voltage Vf of the light emitting diode LED at room temperature of about 25° C.

The first resistor R11 may be connected between the output terminal of the first monitoring amplifier 501 and the second input terminal (−) of the second monitoring amplifier 502. The second resistor R12 may be connected between the second input terminal (−) and the output terminal of the second monitoring amplifier 502. According to an exemplary embodiment of the inventive concept, at least one of the first resistor R11 and the second resistor R12 may be omitted.

The forward voltage Vf of the light emitting diode LED tends to decrease as an ambient temperature is increased and tends to increase as the ambient temperature is decreased. When the ambient temperature is the same as the reference temperature, the forward voltage Vf of the light emitting diode LED becomes the same as the reference voltage Vled, and accordingly, the monitoring signal Vmo may be output as 0 V.

When the ambient temperature is increased to be higher than the reference temperature, the forward voltage Vf becomes lower than the reference voltage Vled, and the monitoring signal Vmo may be output as a positive voltage. When the ambient temperature becomes lower than the reference temperature, the forward voltage Vf of the light emitting diode LED becomes higher than the reference voltage Vled, and the monitoring signal Vmo may be output as a negative voltage.

In other words, the monitoring unit 500 may output the monitoring signal Vmo with a positive voltage when the ambient temperature of the light emitting diode LED included in the backlight unit 400 becomes higher than room temperature, and may output the monitoring signal Vmo with a negative voltage when the ambient temperature of the light emitting diode LED becomes lower than room temperature. The monitoring signal Vmo with the positive voltage may be a high-level voltage and the monitoring signal Vmo with the negative voltage may be a low-level voltage.

Referring to FIG. 2 and FIG. 3, when the ambient temperature of the light emitting diode LED becomes a high temperature, the monitoring signal Vmo with the positive voltage is transmitted to the first luminance compensation unit 430 and the fifth transistor M5 is turned on, and thus the amount of current flowing to the light emitting diode array 410 is increased and the luminance of light emitted from the backlight unit 400 can be increased.

When the ambient temperature of the light emitting diode LED becomes a low temperature, the monitoring signal Vmo with the negative voltage is transmitted to the first luminance compensation unit 430 so that the fifth transistor M5 maintains a turned-off state. The amount of current flowing to the light emitting diode array 410 is not increased by the first luminance compensation unit 430, and the luminance of light emitted from the backlight unit 400 may be maintained with a reference level. The reference level of luminance of the backlight unit 400 may be a predetermined luminance of the backlight unit 400.

According to an exemplary embodiment of the inventive concept, the first input terminal (+) of the second monitoring amplifier 502 may be connected to the output terminal of the first monitoring amplifier 501, and the second input terminal (−) of the second monitoring amplifier 502 may be connected to the reference voltage Vled. In such a case, when the ambient temperature of the light emitting diode LED included in the backlight unit 400 is higher than room temperature, the monitoring signal Vmo with a negative voltage may be output, and when the ambient temperature of the light emitting diode LED is lower than room temperature, the monitoring signal Vmo with a positive voltage may be output. Then, the fifth transistor M5 of the first luminance compensation unit 430 is provided as a p-channel field effect transistor to increase the amount of current flowing to the light emitting diode array 410 when the ambient temperature of the light emitting diode LED becomes a high temperature to increase the luminance of light emitted from the backlight unit 400.

Meanwhile, a phosphor may be applied to a blue light emitting diode LED that emits blue light, among the light emitting diodes LEDs of the backlight unit 400, to instead emit white light toward the display portion 800. In a low-temperature environment, the light emitting diode LED tends to have a short wavelength since a wavelength of light emitted is shortened due to lower temperature, and in a high-temperature environment, the light emitting diode LED tends to have a long wavelength since a wavelength of light emitted is increased due to higher temperature. When the wavelength of the light emitted from the light emitting diode LED is shortened, excitation efficiency of the phosphor is increased so that chromas of red and green are increased and luminance is increased. When the wavelength of the light emitted from the light emitting diode LED is increased, the excitation efficiency of the phosphor is decreased so that chromas of red and green are decreased and luminance is decreased. However, blue maintains a constant chroma regardless of an increase or decrease in the excitation efficiency of the phosphor.

Accordingly, luminance of light emitted from the backlight unit 400 is increased so that a color of the light may be reddish. In addition, luminance of light emitted from the backlight unit 400 is decreased in a high-temperature environment, and a color of the light may be bluish. When a color sense of light emitted from the backlight unit 400 is changed in a low-temperature environment and a high-temperature environment, a color sense of an image displayed in the display portion 800 is changed.

Although the color sense of light emitted from the backlight unit 400 is changed, the signal controller 100 may compensate coordinates of the image display signal ImD so as to prevent the color sense of the image displayed in the display portion 800 from being changed. This will be described below with reference to FIG. 4 to FIG. 6.

Figure 4:
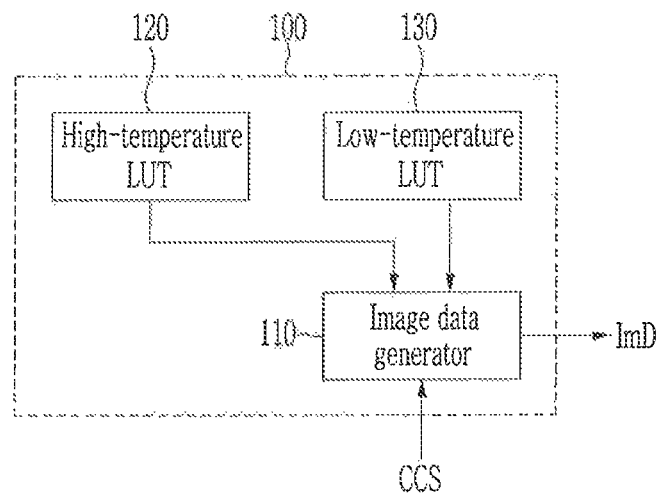
FIG. 4 illustrates a signal controller included in the display device of FIG. 1 according to an exemplary embodiment of the inventive concept.
Figure 5:
FIG. 5 illustrates a high-temperature lookup table of FIG. 4 according to an exemplary embodiment of the inventive concept.

FIG. 4 illustrates a signal controller included in the display device of FIG. 1 according to an exemplary embodiment of the inventive concept. FIG. 5 illustrates a high-temperature lookup table of FIG. 4 according to an exemplary embodiment of the inventive concept. FIG. 6 illustrates a low-temperature lookup table of FIG. 4 according to an exemplary embodiment of the inventive concept.

Referring to FIG. 4 to FIG. 6, the signal controller 100 includes an image data generator 110, the high-temperature lookup table 120, and the low-temperature lookup table 130.

The image data generator 110 generates the image data signal ImD using the image signal ImS. In this case, the image data generator 110 may receive the color coordinate control signal CCS and may adjust color coordinates of the image data signal ImD by using the high-temperature lookup table 120 or the low-temperature lookup table 130 according to the color coordinate control signal CCS. The image data generator 110 may select one of the high-temperature lookup table 120 and the low-temperature lookup table 130 based on a most significant bit (MSB) of the color coordinate control signal CCS.

As shown in FIG. 5, the high-temperature lookup table 120 may include color coordinate weight values of red, green, and blue corresponding to a value of the color coordinate control signal CCS. The value of the color coordinate control signal CCS may correspond to a value of the monitoring signal Vmo. A value of the monitoring signal Vmo with a positive voltage is increased from room temperature to a high temperature, and a value of the color coordinate control signal CCS may be increased accordingly. The high temperature may be about 85° C. The value of the color coordinate control signal CCS may equal a LUT value. As a temperature changes to the high temperature from room temperature, color coordinate values of red and green maintain constant values, but a color coordinate weight value of blue may be decreased. For example, red and green maintain the color coordinate weight values of 1.00, and color coordinate values of red and green are maintained with the reference value when the color coordinate weight values of red and green are multiplied by the color coordinate values of red and green. Here, the reference value of the color coordinates implies a color coordinate value determined by the image signal ImS. On the other hand, the color coordinate weight value of blue is decreased to be smaller than 1.00 as the temperature is increased to the high temperature from room temperature, and when the color coordinate weight value of blue is multiplied by a color coordinate value of blue, the color coordinate value of blue is decreased to be smaller than the reference value. As described above, as the temperature is increased to the high temperature from room temperature, the high-temperature lookup table 120 may include color coordinate weight values that maintain the color coordinate values of red and green with the reference value and reduce color coordinate values of blue.

The image data generator 110 may search a LUT value corresponding to the color coordinate control signal CCS in the high-temperature lookup table 120, and may select color coordinate values of red, green, and blue corresponding to the LUT value. The image data generator 110 may adjust color coordinates of the image data signal ImD by applying the selected color coordinate weight values of red, green, and blue to the image data signal ImD.

Accordingly, when a color sense of light emitted from the backlight unit 400 in a high-temperature environment become bluish, the image data generator 110 reduces color coordinates of blue of the image data signal ImD to prevent a color sense of an image displayed in the display portion 800 from being changed.

Meanwhile, a luminance weight value may be increased as a value of the monitoring signal Vmo is increased. The luminance weight value indicates luminance of light emitted from the backlight unit 400 at a high or low temperature with respect to luminance of light emitted from the backlight unit 400 at room temperature. As the temperature is increased to the high temperature from room temperature, luminance of light emitted from the backlight unit 400 may be increased to compensate for the decrease of luminance of the backlight unit 400 in a high-temperature environment. As shown in FIG. 2 and FIG. 3, the backlight unit 400 may be able to increase luminance of light emitted therefrom in response to the monitoring signal Vmo, and accordingly, the decrease of luminance of light emitted from the backlight unit 400 in a high-temperature environment can be compensated.

As shown in FIG. 6, the low-temperature lookup table 130 may include color coordinate weight values of red, green, and blue corresponding to a value of the color coordinate control signal CCS. A value of the monitoring signal Vmo with a negative voltage is decreased as a temperature is decreased to a low temperature from room temperature, and a value of the color coordinate control signal CCS may be decreased corresponding to the value of the monitoring signal Vmo with the negative voltage. The low temperature may be about −40° C. The color coordinate weight value of blue is constantly maintained as the temperature is decreased to the low temperature from room temperature, but the color coordinate weight values of red and green may be decreased. In other words, the color coordinate weight value of blue is maintained with the reference value, but the color coordinate values of red and blue may be decreased to be smaller than the reference value as the temperature is decreased to the low temperature from room temperature. As described above, as the temperature is decreased to the low temperature from room temperature, the low-temperature lookup table 130 may include color coordinate weight values that maintain color coordinate values of blue with the reference value and decrease color coordinate values of red and green.

The image data generator 110 searches for a LUT value corresponding to the color coordinate control signal CCS from the low-temperature lookup table 130, selects color coordinate weight values of red, green, and blue corresponding to the LUT value, and adjusts color coordinates of the image data signal ImD by applying the selected color coordinates of red, green, and blue to the image data signal ImD.

Accordingly, when a color sense of light emitted from the backlight unit 400 becomes reddish at a low temperature, the image data generator 110 may reduce color coordinates of red and green of the image data signal ImD to prevent a color sense of an image displayed in the display portion 800 from being changed.

Meanwhile, luminance of light emitted from the backlight unit 400 tends to increase in a low-temperature environment. When the luminance of light is increased, the image can be more vividly displayed, and therefore luminance of the light emitted from the backlight unit 400 may not need to be controlled in a low-temperature environment.

Alternatively, luminance of light emitted from the backlight unit 400 may be reduced as a temperature is changed to the low temperature from room temperature to maintain luminance of light emitted from the backlight unit 400 in the low temperature environment to be same as that of room temperature. This will be described below with reference to FIG. 7 and FIG. 8.

The values included in the high-temperature lookup table 120 and the low-temperature lookup table 130 shown in FIG. 5 and FIG. 6 are exemplary values, and the values may be changed depending on features of the display device 10. In addition, a room temperature value, a high-temperature value, and a low-temperature value are not limited to predetermined values, but may be variously modified in consideration of an operation environment of the display device 10.

Hereinafter, referring to FIG. 7 and FIG. 8, a display device that can decrease luminance of light emitted from the backlight unit 400 as a temperature is changed to the low temperature from room temperature will be described. Differences from the display device of FIG. 1 to FIG. 6 will be mainly described.

Figure 7:
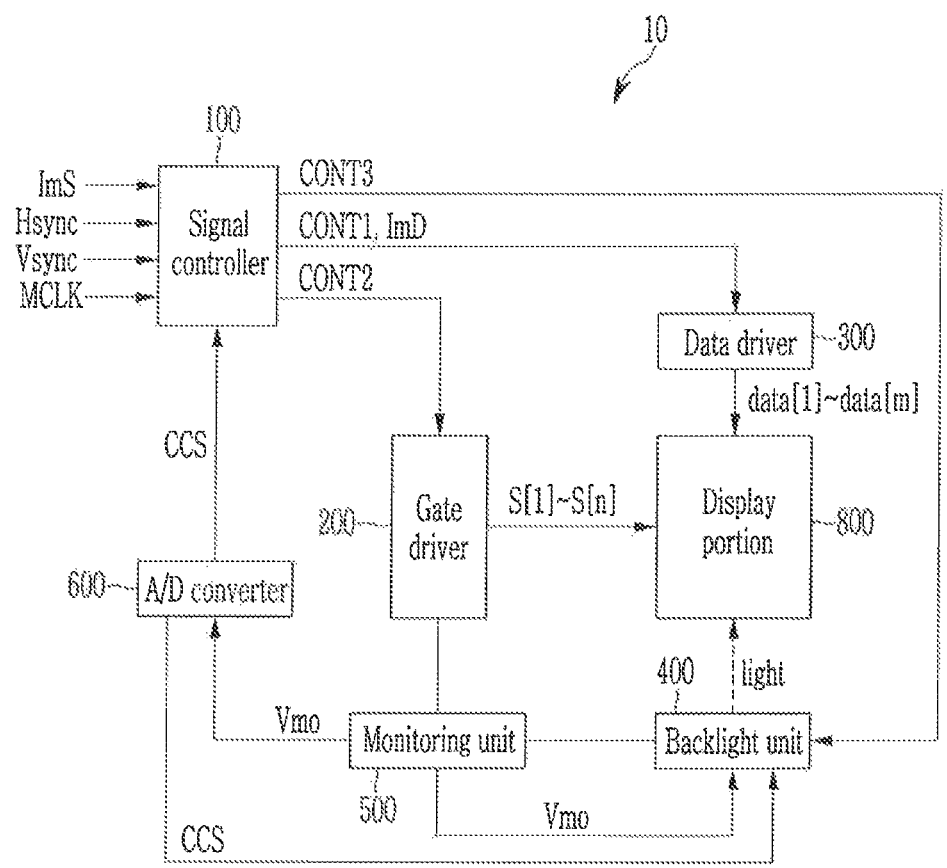
FIG. 7 is a schematic block diagram of a display device according to an exemplary embodiment of the inventive concept.

FIG. 7 is a schematic block diagram of a display device according to an exemplary embodiment of the inventive concept. FIG. 8 illustrates a backlight unit included in the display device of FIG. 7 according to an exemplary embodiment of the inventive concept.

Figure 8:
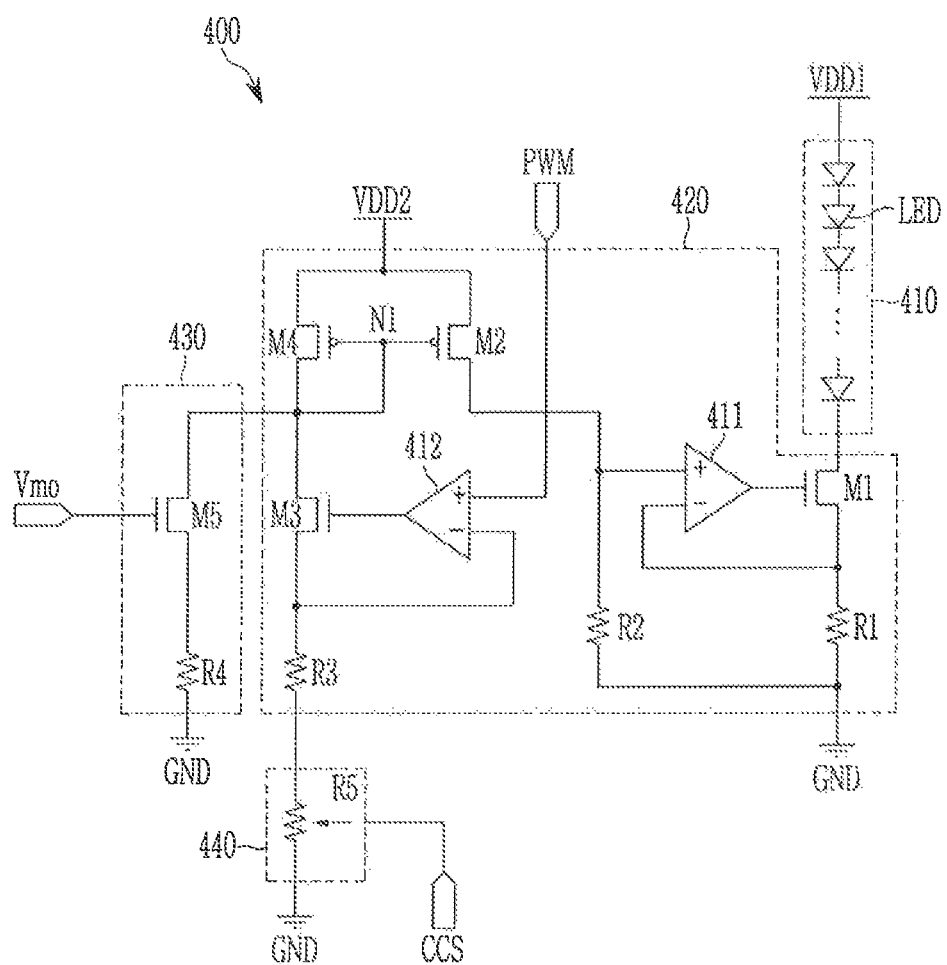
FIG. 8 illustrates a backlight unit included in the display device of FIG. 7 according to an exemplary embodiment of the inventive concept.

Referring to FIG. 7 and FIG. 8, the A/D converter 600 transmits the digital color coordinate control signal CCS to the signal controller 100 and the backlight unit 400.

The backlight unit 400 further includes a second luminance compensation unit 440.

The second luminance compensation unit 440 includes a fifth resistor R5 connected between the third transistor M3 and the ground GND. The fifth resistor R5 may be a digital variable resistor that can change a resistance value according to the color coordinate control signal CCS. When the color coordinate control signal CCS has a value corresponding to room temperature, a resistance value of the fifth resistor R5 is set to 0, and as the color coordinate control signal CCS is decreased in correspondence with a value of the monitoring signal Vmo having a negative voltage, the resistance value of the fifth resistor R5 may be increased.

When the resistance value of the fifth resistor R5 is increased, the backlight controller 420 operates according to the backlight control signal PWM and thus a current flowing to the third resistor R3 and the resistor R5 flows to the second transistor M2, and as the resistance value of the fifth resistor R5 is increased, the amount of current flowing to the third resistor R3 and the fifth resistor R5 is reduced, and accordingly, the amount of current flowing to the second transistor M2 is reduced. Accordingly, the amount of current flowing to the light emitting diode array 410 may be reduced.

In other words, the second luminance compensation unit 440 decreases the luminance of light emitted from the backlight unit 400 by reducing the amount of current flowing to the light emitting diode array 410 in response to the color coordinate control signal CCS in a low-temperature environment where the forward voltage Vf of the light emitting diode LED is increased. Accordingly, luminance of light emitted from the backlight unit 400 may be decreased as the temperature is changed to the low temperature from room temperature.

Except for such a difference, features of the display device 10 described with reference to FIG. 1 to FIG. 6 are substantially the same as the display device 10 described with reference to FIG. 7 and FIG. 8, and therefore the features already described with reference to FIG. 1 to FIG. 6 will not be omitted.

Hereinafter, referring to FIG. 9, a method for driving a display device that can adjust color coordinates and luminance according to temperature will be described.

Figure 9:
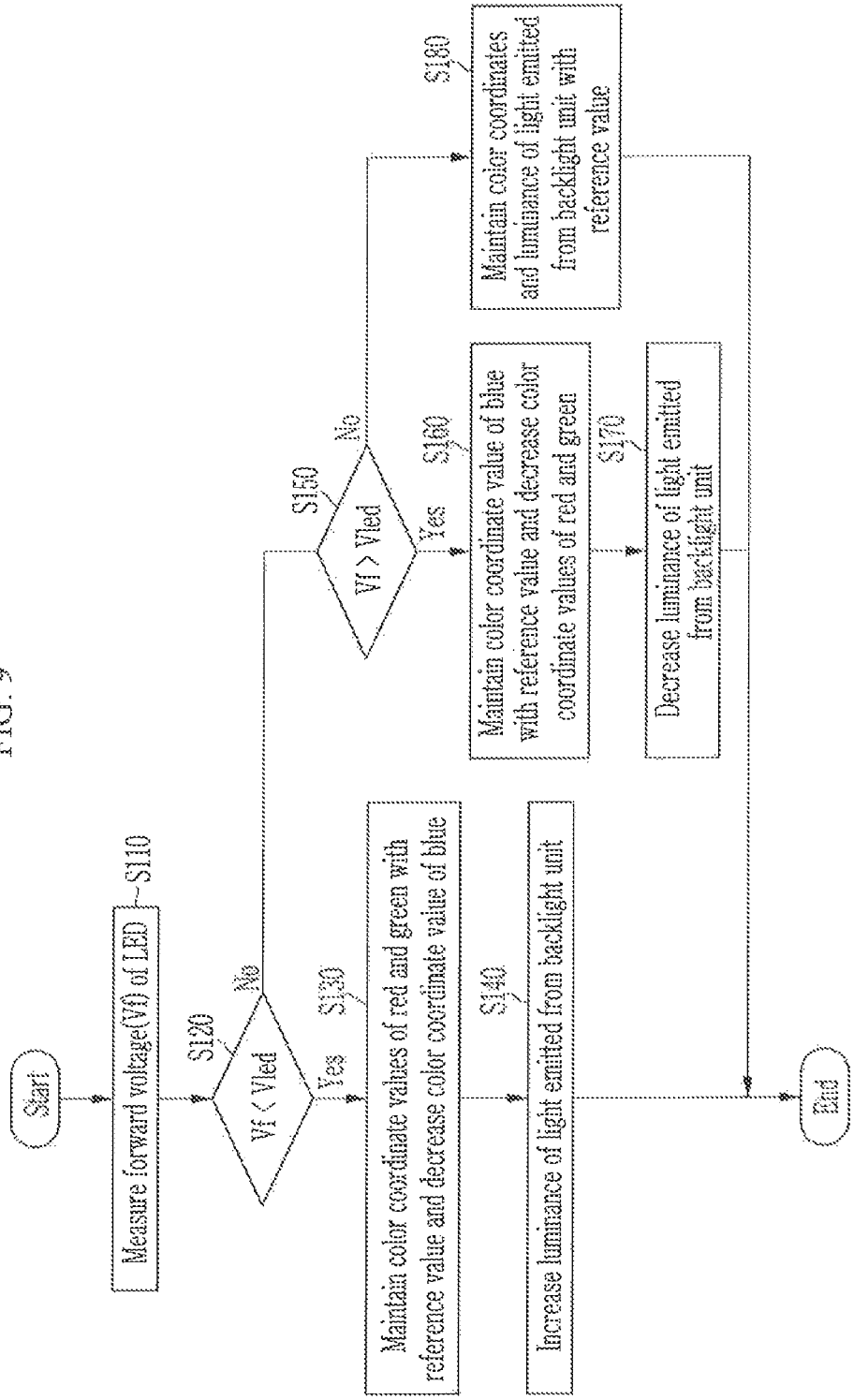
FIG. 9 is a flowchart of a driving method of a display device according to an exemplary embodiment of the inventive concept.

FIG. 9 is a flowchart of a driving method of a display device according to an exemplary embodiment of the inventive concept.

Referring to FIG. 9, the display device 10 measures the forward voltage Vf of the light emitting diode LED among the plurality of light emitting diodes LEDs included in the backlight unit 400 (S110).

The display device 10 determines whether the forward voltage Vf of the light emitting diode LED is lower than the reference voltage Vled (S120).

The display device 10 maintains color coordinate values of red and green as a reference value when the forward voltage Vf of the light emitting diode LED is lower than the reference voltage Vled, and generates the image data signal ImD of which a coordinate value of blue is decreased (S130). In addition, the display device 10 increases luminance of the backlight unit 400 (S140). Accordingly, an image of the substantially the same brightness and color as that of room temperature can be displayed even in a high-temperature environment.

When the forward voltage Vf of the light emitting diode LED is higher than or equal to the reference voltage Vled, the display device 10 determines whether the forward voltage Vf of the light emitting diode LED is higher than the reference voltage Vled (S150).

The display device 10 maintains a color coordinate value of blue as a reference value when the forward voltage Vf of the light emitting diode LED is higher than the reference voltage Vled, and generates an image data signal ImD of which color coordinate values of red and blue are reduced (S160). In addition, the display device 10 decreases luminance of the backlight unit 400 (S170). Accordingly, an image of substantially the same brightness and color as that of room temperature can be displayed even in a low-temperature environment.

When the forward voltage Vf of the light emitting diode LED is the same as the reference voltage Vled, the display device 10 maintains color coordinates and luminance of the backlight unit 400 with the reference value (S180).

As described above, according to exemplary embodiments of the inventive concept, color coordinates and luminance of a display device can be automatically adjusted according to temperature, and thus, a color sense of an image displayed by the display device can be prevented from being changed due to temperature change. Therefore, image quality may be enhanced.

While the inventive concept has been shown and described above with reference to exemplary embodiments thereof, it will be apparent to those of ordinary skill in the art that modifications may be made thereto without departing from the spirit and scope of the inventive concept, as set forth by the following claims.

What is claimed is:

1. A display device comprising:
   a display portion including a plurality of pixels;
   a light emitting diode array including a plurality of light emitting diodes and configured to emit light toward the display portion;
   a monitoring circuit configured to generate a monitoring signal corresponding to a forward voltage of a first light emitting diode of the plurality of light emitting diodes;
   a backlight controller configured to control the amount of current flowing to the light emitting diode array; and
   a first luminance compensation circuit configured to increase the amount of current flowing to the light emitting diode array in response to the monitoring signal,
   wherein the backlight controller comprises:
   a first transistor connected between the light emitting diode array and a ground;
   a first amplifier including an output terminal connected to a gate electrode of the first transistor;
   a second transistor including a gate electrode connected to a first node, and connected between a power voltage and the first amplifier;
   a second amplifier including a first input terminal to which a backlight control signal is input; and
   a third transistor including a gate electrode connected to an output terminal of the second amplifier, and connected between the first node and the ground.

2. The display device of claim 1, wherein the first luminance compensation circuit increases the amount of current flowing to the light emitting diode array when the forward voltage of the first light emitting diode is decreased.

3. The display device of claim 1, wherein the monitoring circuit comprises a first monitoring amplifier that includes a first input terminal connected to an anode of the first light emitting diode, a second input terminal connected to a cathode of the first light emitting diode, and an output terminal configured to output a first voltage difference between the anode and the cathode.

4. The display device of claim 3, wherein the monitoring circuit further comprises a second monitoring amplifier that includes a first input terminal connected to a reference voltage of the first light emitting diode, a second input terminal connected to the output terminal of the first monitoring amplifier, and an output terminal configured to output a second voltage difference between the first voltage difference and the reference voltage as the monitoring signal.

5. The display device of claim 4, wherein the reference voltage of the first light emitting diode is the forward voltage of the first light emitting diode at a predetermined reference temperature.

6. The display device of claim 1, wherein the backlight controller further comprises a fourth transistor that includes a gate electrode connected to the first node and is connected between the power voltage and the third transistor.

7. The display device of claim 6, wherein the first luminance compensation circuit comprises a fifth transistor that includes a gate electrode configured to receive the monitoring signal and is connected between the first node and the ground.

8. The display device of claim 7, further comprising an analog-to-digital (A/D) converter configured to convert the monitoring signal to a digital color coordinate control signal.

9. The display device of claim 8, further comprising a second luminance compensation circuit configured to decrease the amount of current flowing to the light emitting diode array in response to the digital color coordinate control signal.

10. The display device of claim 9, wherein the second luminance compensation circuit comprises a variable resistor connected between the third transistor and the ground, and a resistance value of the variable resistor changes in response to the digital color coordinate control signal.

11. The display device of claim 9, wherein the second luminance compensation circuit decreases the amount of current flowing to the light emitting diode array when the forward voltage of the first light emitting diode is increased.

12. The display device of claim 8, further comprising:
a first lookup table that includes a plurality of first color coordinate weight values maintaining color coordinate values of red and green with a reference value and decreasing a color coordinate value of blue as a temperature of the light emitting diode array is increased from a predetermined reference temperature; and
an image data generator configured to select one of the plurality of first color coordinate weight values that corresponds to the digital color coordinate control signal from the first lookup table and to generate an image data signal using the selected one of the plurality of first color coordinate weight values.

13. The display device of claim 12, further comprising a second lookup table that includes a plurality of second color coordinate weight values maintaining the color coordinate value of blue with the reference value and decreasing the color coordinate values of red and green as the temperature of the light emitting diode array is decreased from the predetermined reference temperature,
wherein the image data generator selects one of the plurality of second color coordinate weight values corresponding to the digital color coordinate control signal from the second lookup table and generates the image data signal using the selected one of the plurality of second color coordinate weight values.

14. A display device comprising:
a display portion including a plurality of pixels;
a backlight circuit including a plurality of light emitting diodes and configured to emit light toward the display portion;
an analog-to-digital (A/D) converter configured to provide a color coordinate control signal to the backlight circuit in response to a monitoring signal; and
a monitoring circuit configured to generate the monitoring signal corresponding to a forward voltage of one of the plurality of light emitting diodes acrd to provide the monitoring signal to the backlight circuit and the A/D converter,
wherein the backlight circuit is configured to adjust luminance of the emitted light in response to the monitoring signal and the color coordinate signal, and
wherein the monitoring circuit comprises a first monitoring amplifier that includes a first input terminal connected to an anode of the one of the plurality of light emitting diodes, a second input terminal connected to a cathode of the one of the plurality of light emitting diodes, and an output terminal configured to output a first voltage difference between the anode and the cathode.

15. The display device of claim 14, wherein
the backlight circuit increases the luminance by increasing the amount of current flowing to the plurality of light emitting diodes when an ambient temperature of the plurality of light emitting diodes increases from a reference temperature, and
the backlight circuit decreases the luminance by reducing the amount of current flowing to the plurality of light emitting diodes when the ambient temperature decreases from the reference temperature.

* * * * *